United States Patent [19]
Groce et al.

[11] 3,870,963
[45] Mar. 11, 1975

[54] VARIABLE RATE PULSE GENERATING SYSTEM

[75] Inventors: Raymond Groce, Mamaroneck; Ernest A. Kussemaul, Sayville, both of N.Y.

[73] Assignee: The Loveshaw Corporation, Deer Park, L. I., N.Y.

[22] Filed: Mar. 26, 1973

[21] Appl. No.: 344,996

[52] U.S. Cl. ............... 328/59, 307/225 R, 307/271, 328/41, 328/63
[51] Int. Cl. .......................... H03k 1/16, H03k 3/72
[58] Field of Search ................ 307/225 R, 271, 269; 328/39, 41, 45, 46, 48, 59, 63

[56] References Cited
UNITED STATES PATENTS
3,621,403 11/1971 Seiy ................................ 328/48 X
3,629,710 12/1971 Durland ........................... 328/48 X Primary Examiner—John Zazworsky
Attorney, Agent, or Firm—Watson Leavenworth Kelton & Taggart

[57] ABSTRACT

A pulse generating system is disclosed wherein output pulses are provided at a rate decreasing or increasing from an initial rate with the passage of time. The output pulses are generated by a comparator responsive (1) to a first counter advanced in count by a constant rate pulse generator and (2) to a second counter which is presettable and is advanced or reduced in count from its preset count by a third counter which generates an output at each generation of a preselected number of pulses by the constant rate pulse generator.

17 Claims, 3 Drawing Figures

3,870,963

VARIABLE RATE PULSE GENERATING SYSTEM

FIELD OF THE INVENTION

This invention relates to systems for generating pulses and more particularly to systems of the type which generate pulses at a rate controllably varying with the passage of time.

BACKGROUND OF THE INVENTION

In general applications thereof, pulse generators are required to provide output pulses at a constant rate. Typically, such rate may be initially preselected within a given rate range but, once so preselected, the rate remains invariant during use of the generator in the absence of operator adjustment.

In certain instances, need arises for pulse generating systems adapted to provide output pulses at an initially preselected rate from which a self-controlled rate change, either faster or slower, is to be effected. For example, where material take-up or feed spools are driven by motors which are speed regulated by reference to a frequency standard, i.e., a pulse train, the frequency standard need provide continuingly lowering rate output as take-up progresses in order to provide constant material transport speed, and vice versa.

SUMMARY OF THE INVENTION

The present invention has as an object thereof such provision of a system for generating pulses at an initial preselectable rate and thence at a rate continually varying in further preselectable manner from such initial rate.

In attaining this object, the invention provides a system comprising first circuit means which generates pulses at a constant rate, second circuit means which generates an output signal on each generation by the first circuit means of pulses in number equal to a first preselected number and third circuit means which generates an output pulse on each generation by the first circuit means of pulses in number equal to the sum of or difference between a second preselected number and the number of output signals generated by the second circuit means. The third circuit means output pulses constitute the system-generated pulses and occur at a rate controllably varying over time without need for any operator input other than initial indication of the two preselected numbers.

The foregoing and other objects and features of the invention will be evident from a consideration of the following detailed explanation of preferred embodiments of the invention and from the drawings wherein like reference numerals identify like parts throughout.

DESCRIPTION OF THE PREFERRED EMBODIMENTS

Figure 1:
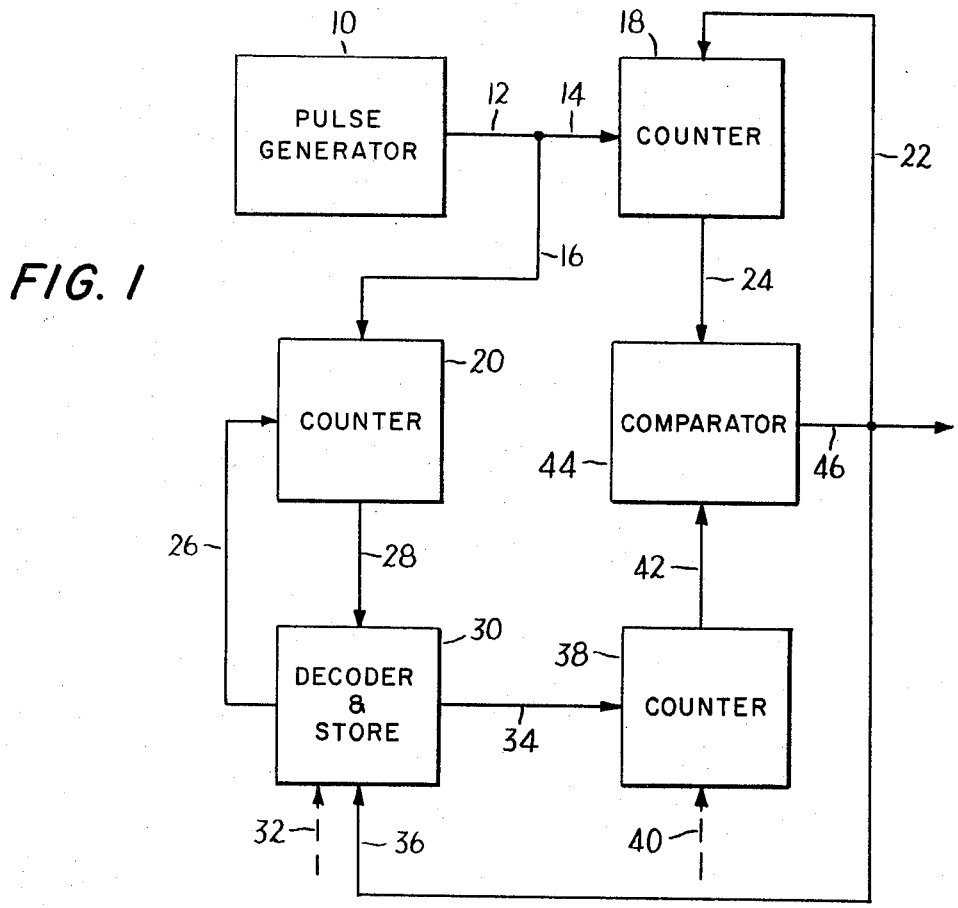
FIG. 1 is a general block diagram of a system in accordance with the invention.

Referring to FIG. 1, pulse generator 10 provides output pulses on line 12 at a constant rate and lines 14 and 16 convey the same to pulse counters 18 and 20.

Counter 18 is resettable to zero count by input signal thereto on line 22 and provides on line 24 an output signal indicative of the number of pulses received after reset.

Counter 20 is resettable to zero count by input signal applied thereto on line 26 and provides on line 28 an output signal indicative of the number of pulses received after reset. Decoder and store 30 is presettable by operator input thereto on line 32 to generate signals on line 26 on each counting by counter 20 of a preselected number of line 16 pulses. The signals so generated by unit 30 may be stored therein for application to line 34 upon input signal to unit 30 over line 36.

Counter 38 is a settable counter, preset to a count equal to a preselected number by operator input thereto on line 40. The counter generates a count-indicative output signal on line 42.

Comparator 44 compares the count-indicative signals applied thereto on lines 24 and 42 and generates an output pulse on line 46 when there signals are indicative of the same number. Comparator 44 output pulses constitute the output pulses of the FIG. 1 system and are further applied to line 22 to reset counter 18 and to line 36 to gate, through line 34 to counter 38, any signal which may then be stored in unit 30.

An example of operation of the FIG. 1 system will now be discussed with passage of time. For purposes of explanation, counter 38 will be preset to a first number, e.g., one thousand, and unit 30 will be preset to a second number, e.g., ten thousand. Upon generation by generator 10 of its first one thousand pulses, counters 18 and 38 are at the same count as is indicated by the signals then on lines 24 and 42. Comparator 44 thereupon applies a pulse to line 46, thus providing the initial system output pulse. Counter 18 is reset to zero count. Counter 20 has not yet reached the count at which it is to be reset and no signal is stored in unit 30. Pulsing of line 36 accordingly has no effect on the state of counter 38 and the discussed cycle repeats and will do so throughout the generation of the next nine system output pulses.

On the generation of the tenth system output pulse, counter 20 reaches the count of ten thousand and the line 28 signal so informs the decoder of unit 30. Responsive to such signal, the decoder applies a pulse to line 26 resetting counter 20 to zero count and unit 30 also stores a signal indicative of the occurrence of this event. On the generation of the eleventh system output pulse, unit 30, responsive to the indication on line 36, applies a pulse to line 34, thus stepping counter 38 one count from its preset count. Where decreased system output pulse rate with passage of time is desired, counter 38 is incremented by the line 34 signal. counter 38 thus applies to line 42 an output signal indicative of the algebraic sum, in this case, an addition, of its preset count and the number (one) or output pulses generated by unit 30. This sum, one thousand and one, represents the count which must now be attained by counter 18 before comparator 44 generates each of the twelfth through twenty-second system output pulses.

This latter cycle of operation of the FIG. 1 system continues, with continuing variation in system output pulse rate. In the example considered, based on the preselected numbers, a first group of output pulses occur at a rate of one pulse per one thousand pulses generated by generator 10, a second pulse group at a rate of one pulse per one thousand and one generator 10 pulses, etc. The initial rate is preselected by operator input to counter 38. The rate of change from such initial rate is preselected by operator input to unit 30. Such rate and rate of change may evidently be set in accordance with the demands of the control application involved and, as discussed, rate of change may be selected so as to increase or decrease the initial rate.

Figure 2:
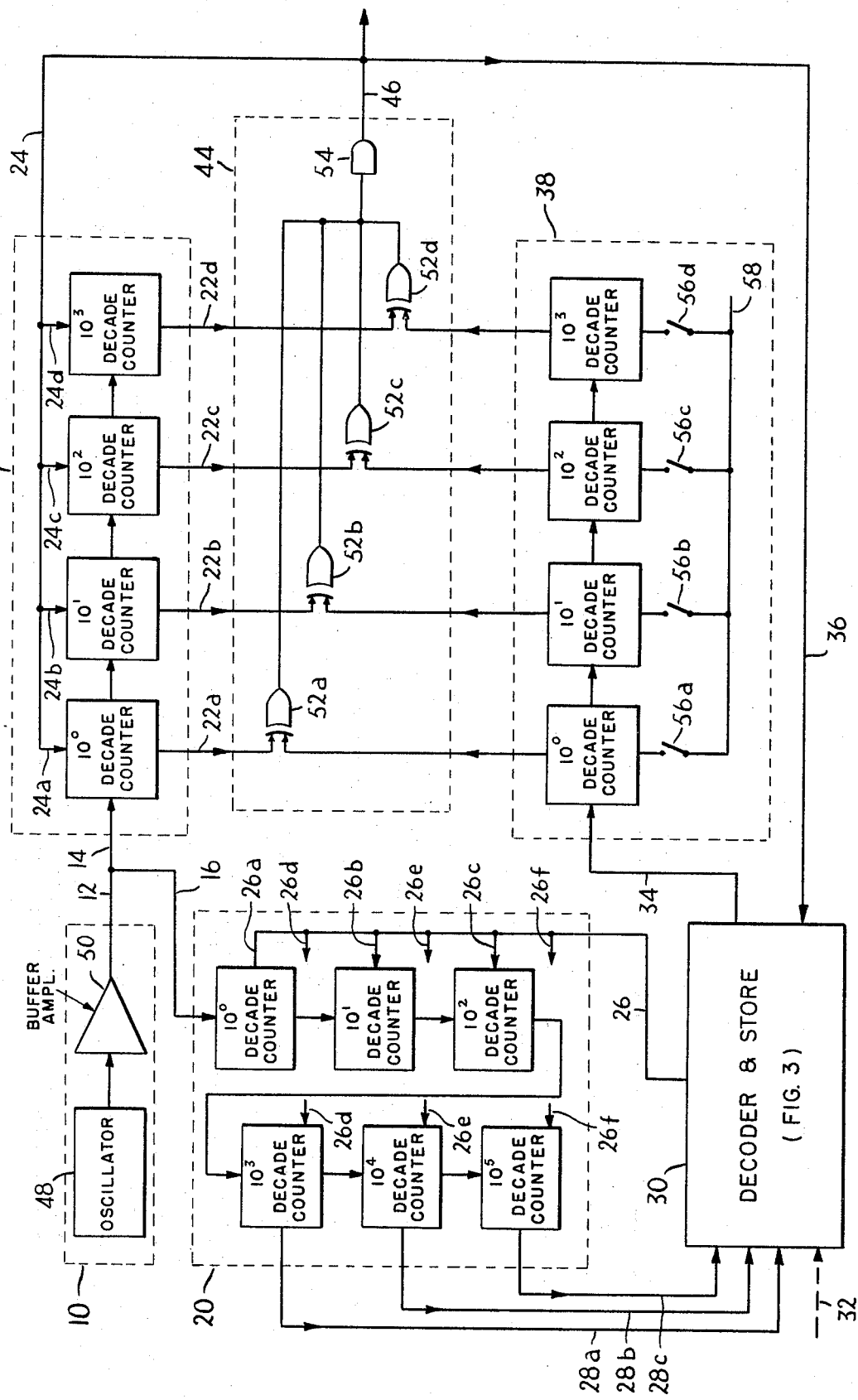
FIG. 2 is detailed block diagram, partly schematic, of the FIG. 1 system.

Referring to the detailed block diagram in FIG. 2, an arrangement is shown of components suitable for use in implementing the functional blocks of FIG. 1. Pulse generator 10 may comprise an oscillator 48 and an amplifier 50 adapted to amplify the oscillator output and shape the same into suitable pulses. Counter 20 is a multiple stage counter, herein including six serially connected decade counter stages providing a count capacity of from zero to $10^6-1$. Reset signals are applied individually to the counter stages over lines 26a-f. In the illustrated arrangement, the outputs of a plurality of the counter stages, e.g., the three most significant digit stages, are connected by lines 28a-c to decoder and store 30.

Counter 18 is comprised of a plurality of decade counter stages in number less than the stage plurality of counter 20. Reset signals are applied individually to the counter stages over lines 24a-d and the output signals thereof are conducted over lines 22a-d to comparator 44.

Counter 38 comprises a like number of counting stages as counter 18 and further includes presetting means comprising switches 56a-d. These switches have first terminals individually connected to the counting stages and second terminals collectively connected to line 58 to which a suitable potential is connected. Operator control of the switches provides for the entry of any preselected number in counter 38.

In its illustrated arrangement comparator 44 includes a plurality of coincidence gates 52a-d, the outputs of each of which are applied to a further gate 54 whose output is applied to line 46. Each of gates 52a-d has first and second input terminals respectively connected to a stage of counter 18 and a stage of counter 38.

Figure 3:
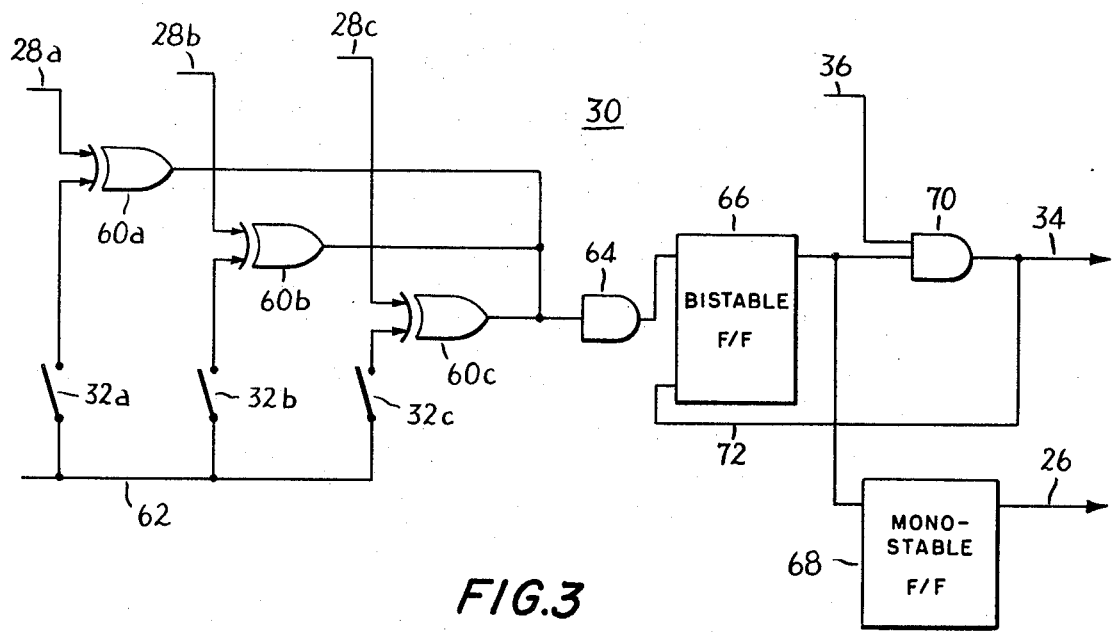
FIG. 3 is detailed block diagram, partly schematic, of the decoder and store of FIGS. 1 and 2.

Referring to FIG. 3, unit 30 includes a decoder section comprised of coincidence gatess 60a-c each of which has a first input terminal connected to one of lines 28a-c and a second input terminal connected to a first terminal of one of switches 32a-c. The switch second terminals are connected in common to line 62 which is in turn connected to a suitable potential. The output lines of gates 60a-c are connected in common to the input terminal of a further gate 64. the output of this gate constitutes the decoder section output and comprises a pulse generated selectively on accordance between the states of switches 32a-c and lines 28a-c. Thus an operator may set switches 32a-c to a particular number upon which condition gate 64 will provide a pulse when accordance is reached with lines 28a-c. As will be appreciated, the inputs derived from switches 32 and 56 may be provided from other sources, such as adaptive control systems or computer systems.

The remaining section of unit 30 is operative to store indication of the occurrence of each pulse generated by gate 64, to reset counter 20 to zero count and, at a particular time thereafter, to convey a pulse to counter 38. A bistable flip-flop 66 serves as the storage unit. a monostable flip-flop 68 responsive to flip-flop 66 provides a pulse on line 26 for resetting counter 20. A coincidence gate 70 is responsive to flip-flop 66 and to each system output pulse provided on line 36 to generate, at the time of occurrence of the system output pulse, a pulse on line 34 effective to step counter 38. Gate 70 also conveys such pulse over line 72 to flip-flop 66 for resetting the same.

In practicing the invention by constructing the above-discussed preferred embodiment thereof, the decade counter stages may each comprise a Texas Instruments Decade Counter SN7490J. Coincidence gates 52a-d and 60a-c may each comprise a Signetics Quad Exclusive Nor Gate (Binary Comparator) N8242A. Coincidence gate 70 may comprise a Texas Instruments Quad 2 Input Gate SN7400. This product also includes a flip-flop suitable for use as flip-flop 66. Flip-flop 68 may comprise a Texas Instruments One Shot Multivibrator SN74121. Further gates 54 and 64 may each comprise a Motorola Hex Inverter MC837P.

As will now be appreciated, various changes and modifications may be introduced in the foregoing preferred embodiment without departing from the invention. Accordingly, such preferred embodiment is intended in an illustrative and not in a limiting sense. The true spirit and scope of the invention is defined in the following claims.

What is claimed is:

1. A system for generating pulses at a rate variable with the passage of time, comprising:
   a. first circuit means for generating pulses at a constant rate;
   b. second circuit means connected to said first circuit means for generating an output signal on each generation by said first circuit means of pulses in number equal to a first preselected constant number; and
   c. third circuit means connected to and responsive to said first and said second circuit means for generating an output pulse on each generation by said first circuit means of pulses in number equal to the algebraic sum of a second preselected number and the number of output signals generated by said second circuit means, the third circuit means output pulses constituting the system-generated pulses.

2. The system claimed in claim 1 wherein said second circuit means includes operator-controllable means for providing input thereto of the magnitude of said first preselected number.

3. The system claimed in claim 1 wherein said third circuit means includes operator-controllable means for providing input thereto of the magnitude of said second preselected number.

4. The system claimed in claim 2 wherein said second circuit means comprises a multiple stage pulse counter and coincidence circuit means responsive to a plurality of the stages of said counter and to said operator-controllable means to generate said second circuit means output signal.

5. The system claimed in claim 1 wherein said third circuit means comprises one pulse counter preset to a count equal to said second preselected number and stepped in count on the generation of each said second circuit means output signal, another pulse counter stepped in count on the generation of each said first circuit means pulse and a comparator circuit responsive to said pulse counters to generate said third circuit means output pulses.

6. A system for generating pulses at a rate variable with the passage of time, comprising:

a. first circuit means for generating pulses at a constant rate;
b. second circuit means connected to said first circuit means for generating an output signal on each generation by said first circuit means of pulses in number equal to a first preselected constant number;
c. third circuit means connected to said second circuit means for generating an output signal indicative of the algebraic sum of a second preselected number and the number of said second circuit means output signals; and
d. fourth circuit means connected to and responsive to said first and said third circuit means for generating an output pulse on each generation by said first circuit means of pulses in number equal to the number indicated by said third circuit means output signal, the fourth circuit means output pulses constituting the system-generated pulses.

7. The system claimed in claim 6 wherein said second circuit means includes operator-controllable means for providing input thereto of the magnitude of said first preselected number.

8. The system claimed in claim 6 wherein said third circuit means includes operator-controllable means for providing input thereto of the magnitude of said second preselected number.

9. The system claimed in claim 7 wherein said second circuit means comprises a multiple stage pulse counter and coincidence circuit means responsive to a plurality of the stages of said counter and to said operator-controllable means to generate said second circuit means output signal.

10. The system claimed in claim 8 wherein said third circuit means comprises a pulse counter preset by said operator-controllable means to a count equal to said second preselected number and stepped in count on the generation of each said second circuit means output signal.

11. The system claimed in claim 6 wherein said fourth circuit means comprises a pulse counter stepped in count on the generation of each said first circuit means pulse and a comparator circuit responsive to said pulse counter and to said third circuit means to generate each said fourth circuit means output pulse.

12. A system for generating pulses at a rate variable with the passage of time, comprising:
a. first circuit means for generating pulses at a constant rate;
b. first and second resettable counter means connected and responsive to said first circuit means for generating output signals indicative of the number of first circuit means pulses received thereby;
c. second circuit means connected to said first counter means for generating an output signal when said first counter means output signal is indicative of a first preselected constant number and for thereupon resetting said first counter means;
d. third circuit means connected to said second circuit means for generating an output signal indicative of the algebraic sum of a second preselected number and the number of said second circuit means output signals; and
e. fourth circuit means connected to said second counter means and said third circuit means for generating an output pulse when the output signals of both said second counter means and said third circuit means are indicative of the same number and for thereupon resetting said second counter means, said fourth circuit means output pulses constituting the system-generated pulses.

13. The system claimed in claim 12 wherein said second circuit means includes operator-controllable means for providing input thereto of the magnitude of said first preselected number.

14. The system claimed in claim 12 wherein said third means includes operator-controllable means for providing input thereto of the magnitude of said second preselected number.

15. The system claimed in claim 13 wherein said first counter means includes multiple stages and wherein said second circuit means comprises coincidence circuit means responsive to a plurality of the stages of said first counter means and to said operator-controllable means to generate said second circuit means output signal.

16. The system claimed in claim 14 wherein said third circuit means comprises a pulse counter preset by said operator-controllable means to a count equal to said second preselected number and stepped in count on the generation of each said second circuit means output signal.

17. The system claimed in claim 12 wherein said third circuit means includes a third counter means presettable in accordance with said second preselected number for generating said third circuit means output signal, a storage circuit means for storing each second circuit means output signal and coincidence circuit means operative on the generation of each system-generated pulse to step said third counter means in accordance with the stored contents of said storage circuit means.

* * * * *